A. WIGGIN.
CARBURETER.

No. 176,156. Patented April 18, 1876.

Witnesses
W. R. Edelen,
John Robey Jr.

Inventor
Andrew Wiggin

UNITED STATES PATENT OFFICE.

ANDREW WIGGIN, OF BOSTON, MASSACHUSETTS.

IMPROVEMENT IN CARBURETERS.

Specification forming part of Letters Patent No. 176,156, dated April 18, 1876; application filed January 26, 1876.

*To all whom it may concern:*

Be it known that I, ANDREW WIGGIN, of the city of Boston, in the State of Massachusetts, have invented certain improvements in Carbureters; and I do hereby declare that the following, taken in connection with the drawings which accompany and form part of this specification, is a description of my invention sufficient to enable those skilled in the art to practice it.

My present invention is in some respects an improvement on the carbureter patented to me on January 4, 1876, No. 171,751. In that patent I employed a spiral gas or air conveyer connected with the float. In my present invention the spiral conveyer or distributer is stationary, and not connected to the float; and I employ a sprinkler to shower the liquid upon that portion of the absorbent which is above the liquid in the air or gas chamber, and to keep such absorbent constantly saturated. I also provide the float with a guide-rod, terminating in a cone, bulb, or valve, which serves to check or to permit the flow of the liquid from the reservoir to the sprinkler, as required; and I also provide an air-tube from the reservoir to the gas or air chamber, to supply air as the fluid is consumed, and to prevent the descent of the liquid from the reservoir at proper periods, the whole constituting an automatic fountain carbureter.

Figure 1:
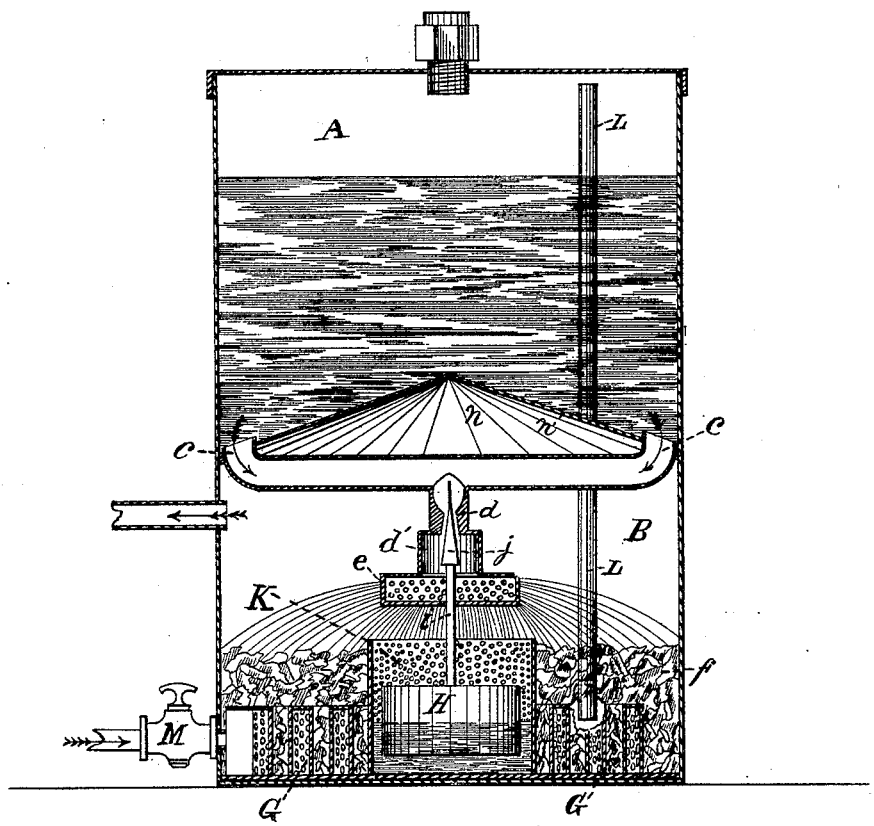
Figure 2:
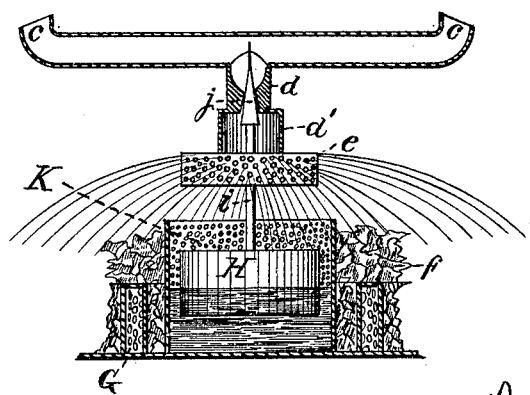

Figure 1 represents a vertical section of an apparatus embodying my invention, and Fig. 2 a detailed view.

A is the reservoir or fountain for the supply of the liquid to the carbureting-chamber B, which may be immediately beneath it, as shown, or distant therefrom, and connected by appropriate pipes, and one fountain or reservoir may be used to supply a series of carbureters, if desired. The vessel A has at its bottom two passages, $c\ c$, one at each side, through which the liquid may descend and enter the receiving-pipe $d$, and thence pass to the stationary sprinkler $e$, affixed to such pipe. The bottom of the vessel A is preferably higher at its center. The sprinkler $e$ has numerous fine perforations at its periphery, the object of which is to cause the descending liquid to be showered in all directions from the center toward the circumference over and upon the absorbent material $f$, placed upon and above the spiral distributer G, located and retained in the bottom of the chamber B, it being understood that the spiral space between the sides of this perforated spiral distributer is also to be filled with an absorbent material. H is a float, having a vertical guide-rod, $i$, projecting upward from its top, and terminating in a plug-valve, $j$, preferably of a long pointed or conical shape, and which, when a sufficient quantity of liquid has descended from A to B, shall close the inlet in tube or pipe $d$, and thus automatically cut off any further supply of liquid until its consumption shall permit the float to descend, and thereby again to open the valve-inlet, and again suffer the liquid to pass down through $d$, and through the sprinkler. The upper portion of the tube $d$ is made smaller than its lower part $d'$. The object of this is to allow a free and unobstructed flow of the liquid when the float falls, giving ample room for such flow around the large or valve end $j$ of the rod $i$. K is a perforated cylindrical shell or box, centrally fixed to the spiral distributer, and projecting above it, and serving as a guide for the float as it ascends and descends. The absorbent material may reach nearly to the top of this perforated shell. L is an air-tube, fixed to the inside of the apparatus, its lower open end extending to a point a little below the line to which the liquid is permitted to rise in the chamber B, and its upper end terminating in the vessel or chamber A, as shown. When the proper amount of the fluid or liquid has descended into the chamber B, the fluid will close or seal the mouth of this air-tube L, and as the vessel A is made air-tight, this closing of the tube will prevent any further flow until needed. The air or gas to be carbonized is admitted through the lower inlet M, and it passes thence into and through spiral distributing-chamber G, and passes out therefrom through its perforations; these perforations being, if desired, disposed in an increasing or graduated series.

Instead of the two passages or tubes $c\ c$, a simple aperture through the center of the partition $n$ may be used to admit the fluid direct to the carbureting-chamber B. The partition in such case may be flat, or raised at its center, and the point of the valve-rod $i$ would in such case project through such aperture, and its enlarged part $j$ act as before, as the valve to cut off or permit the descent of the fluid.

It will be observed, that if, from any cause, the rising of the float should fail to close the inlet-tube between the chambers, the air-tube L, by reason of its forming a vacuum above as the liquid descends from the air-tube chamber A, will prevent any further or undue descent of liquid after the bottom of this tube is closed by the liquid. It will also be seen that all that part of the absorbent material which is so much above the surface of the fluid as not to be subject to saturation from capillary attraction of the fluid in the bottom of the chamber B becomes thoroughly saturated from above: namely, from the sprinkler, and thus the vaporization is greatly accelerated and increased.

I claim—

1. In a carbureter the float H, provided with a guide-rod, $i$, combined with a sprinkler, having perforated sides, the rod passing through such sprinkler, and terminating in an enlarged end, having a fine elongated point, and serving as a valve to check or to prevent the downward flow of the liquid into the said sprinkler, substantially as and for the purpose set forth.

2. The stationary sprinkling or showering vessel $h$, provided with fine perforations in its periphery, depending from and in communication with the fluid vessel or reservoir, and serving to shower the liquid toward the circumference of the carbureting-chamber, and upon the upper surface of that part of the absorbent material which is above the liquid in such chamber, and not moistened by capillary attraction therefrom.

ANDREW WIGGIN.

Witnesses:
JOHN J. HALSTED,
JOHN ROBEY, Jr.